United States Patent
Barenyi et al.

[11] 3,837,668
[45] Sept. 24, 1974

[54] PROTECTION DEVICE FOR VEHICLE PASSENGERS

[75] Inventors: Bela Barenyi, Maichingen; Hermann Renner, Boblingen, both of Germany

[73] Assignee: Daimler-Benz Aktiengesellschaft, Stuttgart, Germany

[22] Filed: Nov. 5, 1971

[21] Appl. No.: 196,062

[30] Foreign Application Priority Data
Nov. 7, 1970 Germany.......................... 2054916

[52] U.S. Cl............................................ 280/150 B
[51] Int. Cl........................................... B60r 21/02
[58] Field of Search............... 280/150 B, 150 SB; 188/1 C

[56] References Cited
UNITED STATES PATENTS
2,740,642  4/1956  Atwood...................... 280/150 S B
2,749,143  6/1956  Chika............................. 280/150 B
2,891,804  6/1959  Frayne......................... 280/150 SB
3,105,702  10/1963  Larson........................... 280/150 B
3,508,633  4/1970  Nishimura........................ 188/1 C FOREIGN PATENTS OR APPLICATIONS
264,159  12/1964  Australia........................ 280/150 B Primary Examiner—Robert R. Song
Attorney, Agent, or Firm—Craig & Antonelli

[57] ABSTRACT

A protection installation for the passengers of vehicles, especially of passenger motor vehicles, in which an impact device adjustable from a rest position into a use position is provided within the area of the persons seated alongside the driver and/or the rear passengers.

54 Claims, 14 Drawing Figures

PATENTED SEP 24 1974  3,837,668
SHEET 1 OF 3
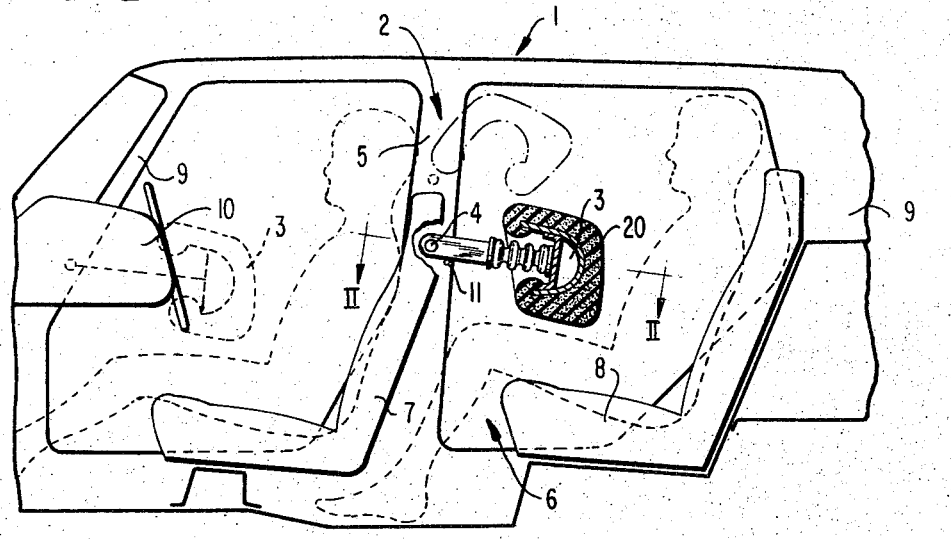
FIG. 1
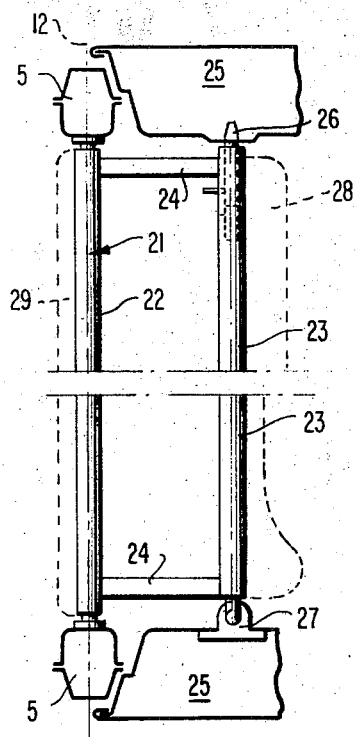
FIG. 4
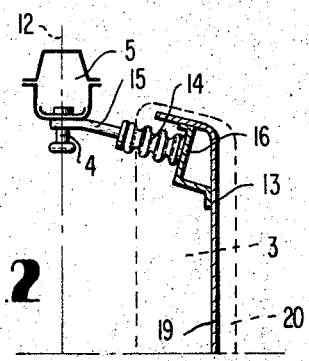
FIG. 2
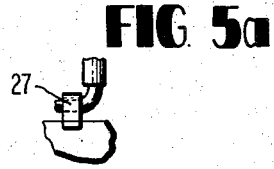
FIG. 5a
FIG. 5
FIG. 3

PROTECTION DEVICE FOR VEHICLE PASSENGERS

The present invention relates to a protection device for the passengers of vehicles, especially of motor vehicles.

Installations for the protection of vehicle passengers are known in the art. Among those are, for example, safety belts, padding of the frame parts and of the instrument panel, recessing of the instruments, installation of a steering column yielding in case of an impact, seat backrest locking mechanisms of the front seats, head rests and the like. These prior art protective measures, however, concentrate predominantly on the driver of the vehicle and to a lesser extent on the passengers, particularly those seated in the rear. Thus, for example, it is not uncommon that the passengers not observing the traffic are thrown forwardly in case of a surprisingly occurring impact accident and suffer considerable injuries. It is thereby not excluded that the rearwardly seated passengers, by reason of the inertia, are thrown over and beyond the backrests of the front seats onto the forwardly seated passengers and/or the driver and injure themselves as well as the forwardly seated passengers, notwithstanding the customary safety measures, such as, safety belts, impact pots at the steering wheel and the like.

It is also known for the reduction of the injury danger of the vehicle passengers in connection with passenger motor vehicles to provide a particularly rigid and stable vehicle construction by an appropriate design of the roof and/or vehicle body whereby the vehicle passengers are protected relatively well by a rigid passenger center cell (see German Patent No. 854,157) against the direct influence of accident impacts. Additionally, it has been disclosed, for example, in connection with a motor vehicle as described in the German Patent No. 851,304 to provide a vehicle roof supported by a single center column in conjunction with sliding doors opening toward the side. Even though it becomes possible thereby to secure the seat backrests or safety belts at the center column, the disadvantages that the rear passengers and/or co-driver are relatively unprotected, are not eliminated by this construction.

The present invention is concerned with the task to provide a protection installation for vehicle passengers, for the co-driver and especially, however, for the passengers seated in the rear, by means of which the passengers are protected in an optimum manner in case of a collision of the vehicle.

The underlying problems are solved according to the present invention in that within the area of the co-driver and/or the rear passengers, an impact installation is provided which is adapted to be selectively adjusted from the rest position into the use position thereof. The adjustment of the impact device may take place advantageously by a pivotal or rotary movement or by a latching or by a hooking-in or the like. This would mean that the protection installation, for example, as rigid body is pivoted underneath the roof or as protection device is detachably arranged in the frame structure and is taken along, for example, in the luggage space and is hooked-in or latched only during use in certain mechanisms. It is particularly advantageous if the pivotal connecting points of the impact device which, for example, is pivotally constructed, are arranged preferably within the area of the door columns, roof columns and the vehicle center, for example, at the instrument panel, at a vehicle center column or in proximity to the backrests. In order to achieve a good action of the protecting device, it is appropriate if the points of pivotal connection are preferably arranged at half the height of the vehicle center cell so that the impact device is disposed in the use position, approximately at chest height in front of the seated passengers.

In order to fix the impact device after the adjustment, it is appropriate that for the use position of the impact device, an abutment or fixing means is provided within the area of the axis of rotation of the impact device and/or within the area of the impact surface.

The impact device can be constructed in appropriate embodiments of the present invention as curved member, as ladder frame or as desk-like member or the like and may be provided preferably between the impact surface and the plane of pivotal connection with elements dissipating the impact energy, such as, for example, corrugated tubing, deformaton pots, undulated curved flat iron sections, damping cylinders and/or the like. In order to be able to absorb well the impact energy, it is appropriate if the portion of the impact device disposed opposite the passengers in the use position is constructed as bending-soft cross bearer, i.e., capable of yielding under bending stresses. The impact surface of the installation may thereby be covered with air hoses inflating at a predetermined deceleration of the vehicle, with impact cushions or with energy-absorbing foamed material.

Another advantageous construction of the subject matter of the present invention resides in that the cross bearer is constructed as tubular member or as hollow body formed from sheet metal shells. This hollow body may advantageously have a conical cross section enlarged in the direction toward the passengers and may be provided with storage compartments or the like accessible on the inside from the upper, lower and/or forward wall surface. As a result thereof with a simultaneous optimum safety of the passengers seated in the rear and/or adjacent the driver, the comfort of the vehicle is increased. It is also feasible, for example, that the desk-like body is constructed at its surface as writing support and contains additional aggregates increasing the comfort of the vehicle such as, for example, lighting units, loud-speakers, air-showers and the like. However, it may also be provided with indentations or embossments for the accommodation of glasses and/or similar objects.

A further advantageous construction of the subject matter of the present invention resides in that the fixing of the impact installation at the axis of rotation, i.e., at a pivot pin, a hinge or the like, takes place by means of conventional clamping means such as, for example, detent disks, friction disks, eccentrics or the like and within the area of the impact surface, preferably at the doors, takes place by means of conventional pins, centering pins, conventional rapid-locking devices or the like. A connection of the door columns or roof column reinforcing the vehicle center cell is realized by the impact installation of the present invention if the impact installation extends over the entire vehicle width, or a connection between a center column and a door column reinforcing the vehicle center cell is realized if a separate impact installation is provided for each seat. An additional advantage resides in that an opening of the doors in case of a lateral accident impact is prevented by the fixing of the impact installation within the area of the impact surface at the doors or a so-called children-safety feature is realized against an unauthorized opening of the doors by the children during the drive which is prevented thereby. In particular, the rigidity of the vehicle against laterally occurring collision forces is considerably increased.

Accordingly, it is an object of the present invention to provide a protection installation for vehicle passengers which avoids by simple means the aforementioned shortcomings and drawbacks encountered in the prior art.

Another object of the present invention resides in protection devices which protect in particular the rear passengers and the passengers seated alongside the driver in an effective manner.

A further object of the present invention resides in protection devices for vehicle passengers which, at the same time, reinforce the center cell as regards rigidity thereof.

Still a further object of the present invention resides in protection installations of the type described above which are effective for their intended purposes, reliable in operation and easily installed without significantly reducing the space available on the inside of the vehicle which is required for travelling in comfort.

Still another object of the present invention resides in a protection installation for vehicle passengers which utilizes relatively few parts that can be easily installed into the vehicle without impairing the comfort of the passengers.

These and other objects, features, and advantages of the present invention will become more apparent from the following description when taken in connection with the accompanying drawing which shows, for purposes of illustration only, several embodiments in accordance with the present invention, and wherein:

FIG. 1 is a somewhat schematic partial cross-sectional view through a motor vehicle with an impact device arranged in the rear seat;

FIG. 2 is a partial cross-sectional view taken along line II—II of FIG. 1;

FIG. 3 is a partial cross-sectional view, similar to FIG. 2, of a modified embodiment of a protection device in accordance with the present invention;

FIG. 4 is a plan view of another embodiment of a protection device in accordance with the present invention;

FIG. 5 is a plan view of still another modified embodiment of a protection device in accordance with the present invention;

FIG. 5a is a partial elevational view illustrating the fastening arrangement of the protection device of FIG. 5;

Figure 9:
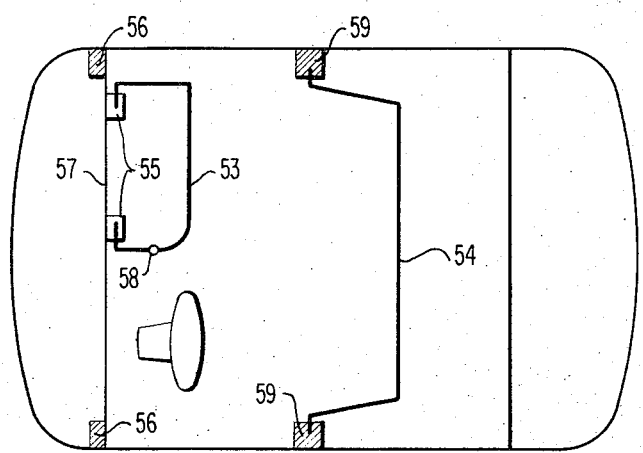
Figure 10:
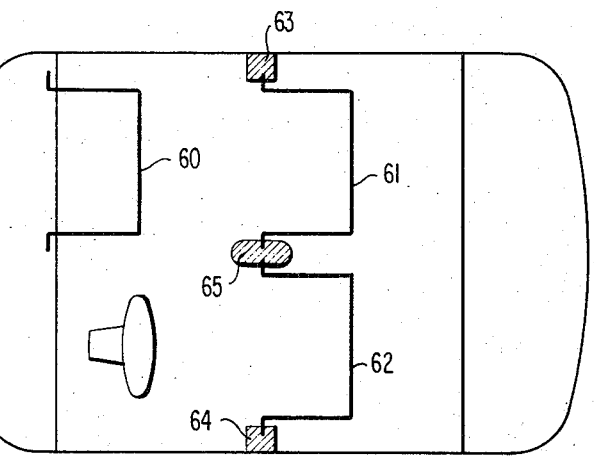

FIGS. 6 and 6a, 7 and 7a, and 8 and 8a are, respectively, somewhat schematic plan and side views of three further modified embodiments of protective installations in accordance with the present invention;

FIG. 9 is a schematic plan view of a vehicle illustrating the arrangement of the protective installations in one embodiment of the present invention; and FIG. 10 is a schematic plan view of a vehicle illustrating a modified arrangement of protective installations in a motor vehicle in accordance with the present invention.

Referring now to the drawing wherein like reference numerals are used throughout the various views to designate like parts, and more particularly to FIG. 1, a passenger center cell generally designated by reference numeral 2 of a passenger motor vehicle generally designated by reference numeral 1 is illustrated in this figure in partial cross section. The impact device 3 pivoted into the use position thereof can be seen in the rear of the vehicle 1. In the illustrated embodiment, the pivot points 4 of the impact installations are approximately at half the height of the door columns 5. The impact device 3, in case it is not needed, may be pivoted downwardly or, as shown in dash and dot lines, may be pivoted upwardly whereby it may then serve simultaneously as headrest for the forwardly seated passengers or with a suitable construction may serve as a storage surface filling the intermediate space 6 between the front seats 7 and the rear seats 8. The points of pivotal connection, however, may also be arranged at the roof columns 9 or at a center column disposed in the vehicle center or in proximity of the backrests of the seats 7, 8. It is thereby also possible that the impact installation is arranged recessed, for example, on the inside of the instrument panel 10 or in the rear portion of the backrest of the front seat 7 and is adapted to be pulled out.

In order to retain the impact installation 3 in the use position, an abutment 11 may be provided, against which the impact device is forced by its own weight or, for example, by a spring force. However, a conventional fixing means may also be provided within the area of the axis of rotation 12 of the impact device (FIGS. 2 to 5) and/or within the area of the impact surface.

In FIG. 2, the impact installation 3 is illustrated in partial cross-sectional view, taken along line II—II of FIG. 1. The impact device 3 is constructed as approximately bow-shaped, curved member 13 and is supported at the door columns 5 by way of arms 15 provided with deformation members 14 and by way of the points of pivotal connection 4. Whereas the curved member 13 is constructed in FIG. 1 as simple bent sheet metal plate reinforced in the corners by angular profiles or sections 16, FIG. 3 illustrates a considerably more rigid construction of the curved member 13 in that the reinforcement 17 completes the curved member 13 into a closed hollow bearer.

FIG. 3 illustrates therebeyond another embodiment of a deformation member, for example, an undulated flat iron section 18. The curved members 13 illustrated in FIGS. 2 and 3 extend over the entire vehicle width and form a connection between the door columns 5 considerably reinforcing the passenger center cell. However, it is also possible that the curved bending bearers 13 are arranged between the door columns 5 and a center column (not shown in the drawing) so that the curved members 13 are adapted to be pivoted into the use position thereof independently of one another. A force acting in the direction of arrow 19 (FIG. 2) causes, depending on its strength, a bending-through of the curved member 13 or a going-into-action of the deformation members 14, 18. The impact surface of the impact installation 3 may be covered with air hoses inflated at a predetermined vehicle deceleration, impact cushions or energy-absorbing foamed material 20 of any known type.

In FIGS. 4, 5 and 5a, an impact installation is illustrated which is constructed as ladder frame generally designated by reference numeral 21. The door columns 5 of the passenger center cell 2 are connected with each other by means of a rotary tubular member 22, at which is pivotally connected the bending-soft bearer 23 by way of struts 24, which bearer is capable of yielding in the presence of bending stresses. The bending-soft cross bearer 23 is retained in the doors 25 by means of conventional locking devices 26 (FIG. 4) or 27 (FIGS. 5 and 5a) so that, on the one hand, the doors cannot open by themselves in case of an accident impact and, on the other, the bending-soft cross bearer is able to bend-through in the driving direction in case of a larger impact. The bending-soft bearer 23 and the rotary tubular member 22 are also covered with impact cushions 28 and 29, respectively.

Figure 6:
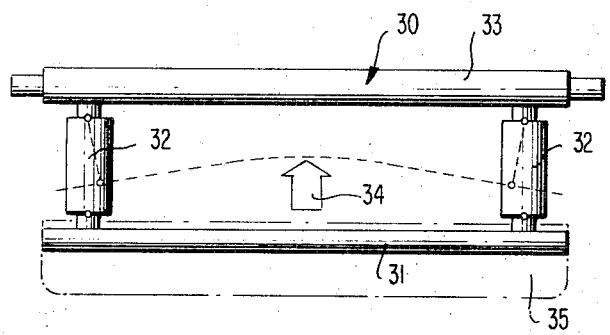
Figure 6A:
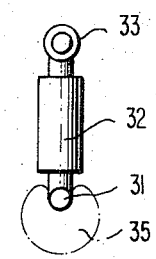

A further protective installation in the form of a ladder frame generally designated by reference numeral 30 is illustrated in FIGS. 6 and 6a. The bending-soft bearer 31 is supported at the rotary tubular member 33 by way of deformation members 32 of any conventional construction. In case of a load corresponding to the direction of arrow 34, the body of a passenger impinging on the foamed material cover 35 is caught whereby the bending-soft cross bearer 31 capable of yielding under bending stresses bends-through corresponding to the dash position. The deformation members 32 absorb simultaneously a large portion of the impact energy.

Figure 7:
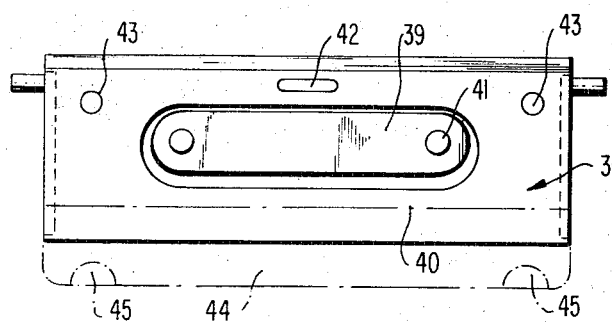
Figure 7A:
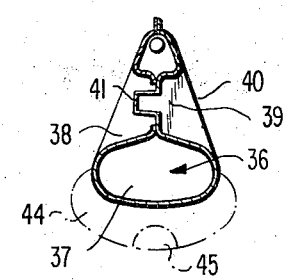

FIGS. 7 and 7a illustrate a further embodiment of an impact installation according to the present invention. The impact device is constructed advantageously as hollow body generally designated by reference numeral 36 which is conically enlarged in the direction toward the passengers. The hollow spaces resulting from the shape of the sheet metal plates forming the hollow body may be used as storage compartments 37, 38, 39. The storage compartments are accessible depending on the position of the impact device. If the impact device 36 is pivoted from the horizontal position into an inclined position, then the surface 40 of the impact device 36 may also be used as writing support. The indentations 41 serve, for example, for the receipt of glasses or the like. The installation of lighting bodies 42 and loudspeakers 43 or air showers 45 arranged recessed in the foamed material layer 44 is also possible.

Figure 8:
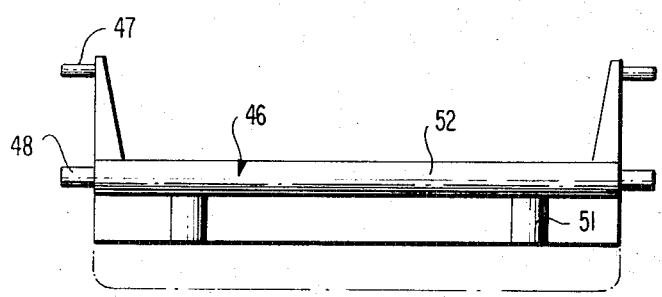
Figure 8A:
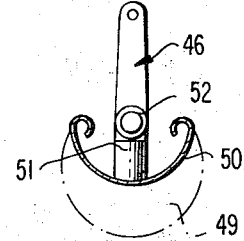

FIGS. 8 and 8a illustrate a further protection installation generally designated by reference numeral 46 which is adapted to be latched, for example, by means of the pins 47 and 48 in openings provided at the vehicle center columns 5 and/or the doors 25. The impact device 46 can therefore be taken along as additionally structural part in the luggage space and can be installed and suspended in the detent mechanisms in case of use. The foamed material layer 49 is supported by way of a bending-soft sheet metal plate 50 (FIG. 8a) and deformation members 51 at the bending-soft cross bearer 52 of the impact device 46.

FIGS. 9 and 10 illustrate schematic arrangements of the impact device in a motor vehicle. According to FIG. 9, two impact installations 53 and 54 are provided whereby the front impact device 53 is arranged by way of joints 55 within the area of the forward roof column 56 at the cross bearer 57 connecting the roof columns 56. The impact device 53 may be supported by means of an additional brace 58 which is secured, for example, at the transmission tunnel or at the fire wall. The rear impact device 54 is supported at the vehicle frame by way of the passenger door columns 59 as is illustrated, for example, in FIGS. 1 to 3.

FIG. 10 illustrates a further schematic arrangement of three impact installations 60, 61 and 62. The support of the impact devices 61 and 62 takes place by way of the supporting door columns 63 and 64 and by way of a column 65 arranged in the vehicle center which, for example, may connect the roof with the chassis or also may be constructed only as truncated cone. The impact devices illustrated in FIGS. 9 and 10 are in the use position thereof.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. An impact protection installation for protecting passengers of vehicles comprising:
    impact means for absorbing impact energy of passengers, said impact means extending transversely to the direction of motion of the vehicle and disposed in front of at least one passenger;
    pivot means spaced in front of said impact means for pivoting said impact means between an operable position and a rest position about a horizontal axis extending transverse to said direction of motion;
    deformation means operatively connecting said impact means to said pivot means for dissipating said impact energy; and
    locking means for securing said impact means in said operable position,
    said pivot means being secured to fixed parts of the vehicle, said fixed parts including at least one of vehicle door columns, roof columns and center columns.

2. A protection installation according to claim 1, wherein said fixed parts are door columns.

3. A protection installation according to claim 1, wherein said fixed parts are roof columns.

4. A protection installation according to claim 1, wherein the fixed parts are arranged in the vehicle center.

5. A protection installation according to claim 4, characterized in that the fixed parts are arranged at the instrument panel.

6. A protection installation according to claim 4, wherein said fixed parts are arranged at a vehicle center column.

7. A protection installation according to claim 4, characterized in that said fixed parts are arranged in proximity to seat backrests.

8. A protection installation according to claim 1, wherein the fixed parts are arranged at the vehicle center and at least one of said door columns and roof columns.

9. A protection installation according to claim 8, wherein said pivot means are arranged at approximately half the height of the passenger center cell of the vehicle.

10. A protection installation according to claim 1, wherein said locking means includes an abutment.

11. A protection installation according to claim 1, wherein said locking means includes a fixing means adjacent the axis of rotation of the impact means.

12. A protection installation according to claim 11, wherein said locking means is provided adjacent the impact surface.

13. A protection installation according to claim 1, wherein said locking means is provided adjacent the impact surface.

14. A protection installation according to claim 1, characterized in that the impact means is constructed as curved member.

15. A protection installation according to claim 1, characterized in that the impact means is constructed as ladder-like frame.

16. A protection installation according to claim 1, characterized in that the impact means is constructed as desk-like member.

17. A protection installation according to claim 1, wherein said deformation means are arranged between said impact means and said pivot means.

18. A protection installation according to claim 17, wherein said deformation means are undulated tubular members.

19. A protection installation according to claim 17, characterized in that said deformation means are deformation pot means.

20. A protection installation according to claim 17, characterized in that said deformation impact means are undulated flat-iron sections.

21. A protection installation according to claim 17, characterized in that said deformation means are damping cylinders.

22. A protection installation according to claim 17, characterized in that the portion of the impact means arranged opposite the passengers in the use position is constructed as bending-soft cross bearer.

23. A protection installation according to claim 22, characterized in that an impact surface of the impact means is covered with air hoses inflating with a predetermined deceleration of the vehicle.

24. A protection installation according to claim 22, characterized in that an impact surface of the impact means is covered with impact cushion means.

25. A protection installation according to claim 22, characterized in that an impact surface of the impact means is covered by energy-absorbing foamed material.

26. A protection installation according to claim 22, characterized in that the cross bearer is constructed as tubular member.

27. A protection installation according to claim 22, characterized in that the cross bearer is constructed as hollow body foamed of sheet shells.

28. A protection installation according to claim 27, characterized in that the hollow body has a conical cross section enlarged in the direction toward the passengers and includes storage compartments accessible on the inside from at least one of the upper, lower and forward wall surfaces.

29. A protection installation according to claim 22, characterized by fixing means for fixing the impact means at the axis of rotation by clamping means.

30. A protection installation according to claim 29, characterized by fixing means for fixing the impact means within the area of the impact surface.

31. A protection installation according to claim 1, characterized in that the portion of the impact means arranged opposite the passengers in the use position is constructed as bending-soft cross bearer.

32. A protection installation according to claim 31, characterized in that the cross bearer is constructed as tubular member.

33. A protection installation according to claim 32, characterized in that the cross bearer is constructed as hollow body foamed of sheet shells.

34. A protection installation according to claim 33, characterized in that the hollow body has a conical cross section enlarged in the direction toward the passengers and includes storage compartments accessible on the inside from at least one of the upper, lower and forward wall surfaces.

35. A protection installation according to claim 34, characterized in that said storage compartments are accessible from the upper and lower wall surfaces of the hollow body.

36. A protection installation according to claim 34, characterized in that at least one of the storage compartments is accessible from the forward wall surface.

37. A protection installation according to claim 1, characterized in that an impact surface of the impact means is covered with air hoses inflating with a predetermined deceleration of the vehicle.

38. A protection installation according to claim 1, characterized in that an impact surface of the impact means is covered with impact cushion means.

39. A protection installation according to claim 1, characterized in that an impact surface of the impact means is covered by energy-absorbing foamed material.

40. A protection installation according to claim 1, wherein said locking means fix said impact means at the axis of rotation by clamping means.

41. A protection installation according to claim 40, characterized in that said clamping means includes detent disks.

42. A protection installation according to claim 40, characterized in that the clamping means include friction disks.

43. A protection installation according to claim 40, characterized in that the clamping means include eccentric means.

44. A protection installation according to claim 1, wherein said locking means fix said impact means within the area of an impact surface.

45. A protection installation according to claim 44, wherein said locking means fixes the impact means at the doors.

46. A protection installation according to claim 44, wherein said locking means includes pins.

47. A protection installation according to claim 44, characterized in that said locking means includes centering pins.

48. A protection installation according to claim 44, wherein said locking means includes rapid-locking means.

49. A protection installation according to claim 1, wherein said impact means includes a single member extending at least half the width of the vehicle.

50. A protection installation according to claim 49, wherein said single member extends substantially the entire width of the vehicle.

51. A protection installation according to claim 1, wherein said impact means includes a single member extending substantially the entire width of the vehicle.

52. A protection installation according to claim 1, wherein said at least one passenger is seated alongside the driver.

53. A protection installation according to claim 1, wherein said at least one passenger is at least one of the rear passengers.

54. A protection installation according to claim 53, wherein said at least one passenger is seated alongside the driver.

* * * * *